United States Patent
DeFilippis et al.

(10) Patent No.: US 7,175,934 B2
(45) Date of Patent: Feb. 13, 2007

(54) SINGLE PUMP FUEL CELL SYSTEM

(75) Inventors: Michael S. DeFilippis, Delmar, NY (US); Graciela I. Varela, Troy, NY (US); Luke E. Yetto, Albany, NY (US); Keith G. Brown, Clifton Park, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 84 days.

(21) Appl. No.: 10/843,041

(22) Filed: May 11, 2004

(65) Prior Publication Data

US 2005/0255358 A1   Nov. 17, 2005

(51) Int. Cl.
*H01M 8/04* (2006.01)

(52) U.S. Cl. .............................. 429/34; 429/25; 429/26

(58) Field of Classification Search ....................... None
See application file for complete search history.

(56) References Cited

U.S. PATENT DOCUMENTS

| | | | |
|---|---|---|---|
| 4,904,548 A | 2/1990 | Tajima | |
| 6,265,093 B1 | 7/2001 | Surampudi et al. | |
| 6,509,112 B1 | 1/2003 | Luft et al. | |
| 6,536,551 B1 | 3/2003 | Tanaka et al. | |
| 2002/0106542 A1 | 8/2002 | Matejcek et al. | |
| 2002/0197522 A1 | 12/2002 | Lawrence et al. | |
| 2003/0129464 A1 | 7/2003 | Becerra et al. | |
| 2004/0038100 A1* | 2/2004 | Cargnelli et al. | 429/26 |
| 2004/0072049 A1 | 4/2004 | Becerra et al. | |
| 2004/0185313 A1* | 9/2004 | Halter et al. | 429/22 |
| 2004/0209135 A1* | 10/2004 | Wexel et al. | 429/26 |

FOREIGN PATENT DOCUMENTS

| | | |
|---|---|---|
| EP | 1 274 144 A2 | 8/2003 |
| JP | 203331885 | 11/2003 |
| WO | WO 2005/004270 A1 | 1/2005 |

OTHER PUBLICATIONS

International Application No. PCT/US2005/016215, Invitation to Pay Additional Fees and Communication Relating to the Results of the Partial International Search, Mailed Jan. 23, 2003, International Filing Date May 9, 2005.

* cited by examiner

*Primary Examiner*—John S. Maples
(74) *Attorney, Agent, or Firm*—Cesari and McKenna LLP

(57) ABSTRACT

A single pump fuel cell system is provided that has multiple valves that have selective positioning to control fluidic flow throughout a fuel cell system. One of the valves provides for high and low concentration fuel dosing. Another valve or series of valves controls an unreacted fuel recirculation loop leading from the fuel cell. Another valve or series of valves control condensate collection by the fuel cell system, and allows the purging of the anode recirculation loop. Each of the valves is selectable between various positions to place the fuel cell system in a desired operating mode. A heat exchanger may also be employed to dissipate heat as desired out of the fuel cell system. A concentration sensor can also be employed to aid in achieving a desired fuel concentration within the fuel cell system.

14 Claims, 6 Drawing Sheets

SINGLE PUMP FUEL CELL SYSTEM

BACKGROUND OF THE INVENTION

1. Field of the Invention

This invention relates generally to fuel cell systems, and more particularly, to techniques for managing fluid flow throughout the fuel cell system.

2. Background Information

Fuel cells are devices in which electrochemical reactions are used to generate electricity from fuel and oxygen. A variety of materials may be suited for use as a fuel depending upon the materials chosen for the components of the cell. Organic materials in liquid form, such as methanol are attractive fuel choices due to the their high specific energy.

Fuel cell systems may be divided into "reformer-based" systems (i.e., those in which the fuel is processed in some fashion to extract hydrogen from the fuel before the hydrogen is introduced into the fuel cell system) or "direct oxidation" systems in which the fuel is fed directly into the cell without the need for separate internal or external fuel processing. Many currently available fuel cells are reformer-based. However, because fuel processing is complex and generally requires costly components which occupy significant volume, reformer based systems are more suitable for comparatively high power applications.

Direct oxidation fuel cell systems may be better suited for applications in smaller mobile devices (e.g., mobile phones, handheld and laptop computers), as well as for somewhat larger scale applications. In direct oxidation fuel cells of interest here, a carbonaceous liquid fuel (typically methanol or an aqueous methanol solution) is directly introduced to the anode face of a membrane electrode assembly (MEA).

One example of a direct oxidation fuel cell system is the direct methanol fuel cell or DMFC system. In a DMFC system, a mixture comprised of predominantly methanol or methanol and water is used as fuel (the "fuel mixture"), and oxygen, preferably from ambient air, is used as the oxidant. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate, as is discussed further hereinafter.

Typical DMFC systems include a fuel source or reservoir, fluid and effluent management systems, and air management systems, as well as the direct methanol fuel cell ("fuel cell") itself. As used herein, the term "fuel cell system" shall include systems that include a single fuel cell, multiple fuel cells coupled in a fuel cell array, and/or a fuel cell stack. The fuel cell typically consists of a housing, hardware for current collection, fuel and air distribution, and a membrane electrode assembly ("MEA") disposed within the housing.

The electricity generating reactions and the current collection in a direct oxidation fuel cell system take place at and within the MEA. In the fuel oxidation process at the anode, the fuel typically reacts with water and the products are protons, electrons and carbon dioxide. Protons from hydrogen in the fuel and in water molecules involved in the anodic reaction migrate through the proton conducting membrane electrolyte ("PCM"), which is non-conductive to the electrons. The electrons travel through an external circuit, which contains the load, and are united with the protons and oxygen molecules in the cathodic reaction. The electronic current through the load provides the electric power from the fuel cell. The invention set forth herein can also be implemented with any fuel cell system with a single pump and multiple valves for managing fluids within a fuel cell system including direct oxidation fuel cell systems and reformer-based systems. The invention can be implemented in fuel cell systems that use a proton exchange medium other than as described herein including but not limited to those systems that implement a silicon or liquid electrolyte.

A typical MEA includes an anode catalyst layer and a cathode catalyst layer sandwiching a centrally disposed PCM. One example of a commercially available PCM is NAFION® (NAFION® is a registered trademark of E.I. Dupont de Nemours and Company), a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. A PCM that is optimal for fuel cell applications possesses a good protonic conductivity and is well-hydrated. On either face of the catalyst coated PCM, the MEA further typically includes a "diffusion layer". The diffusion layer on the anode side is employed to evenly distribute the liquid or gaseous fuel over the catalyzed anode face of the PCM, while allowing the reaction products, typically gaseous carbon dioxide, to move away from the anode face of the PCM. In the case of the cathode side, a diffusion layer is used to allow a sufficient supply of and a more uniform distribution of gaseous oxygen to the cathode face of the PCM, while minimizing or eliminating the accumulation of liquid, typically water, on the cathode aspect of the PCM. Each of the anode and cathode diffusion layers also assist in the collection and conduction of electric current from the catalyzed PCM to the current collector.

Direct oxidation fuel cell systems for portable electronic devices ideally are as small as possible for a given electrical power and energy requirement. The power output is governed by the rates of the reactions that occur at the anode and the cathode of the fuel cell operated at a given cell voltage. More specifically, the anode process in direct methanol fuel cells, which use acid electrolyte membranes including polyperflourosulfonic acid and other polymeric electrolytes, involves a reaction of one molecule of methanol with one molecule of water. In this process, water molecules are consumed to complete the oxidation of methanol to a final $CO_2$ product in a six-electron process, according to the following electrochemical equation:

$$CH_3OH + H_2O \Rightarrow CO_2 + 6H^+ + 6e^- \qquad 1)$$

Generally, in order to maintain process (1) during fuel cell operation, it is important that fluid flow throughout the fuel cell system is balanced correctly. More specifically, the delivery of fuel at the appropriate concentration is a consideration and it varies with fuel cell operating conditions and ambient conditions. Secondly, water management is an important consideration because water is a reactant in the anodic process at a molecular ratio of 1:1 (water:methanol), so that the supply of water, together with methanol to the anode at an appropriate weight (or volume) ratio is critical for sustaining this process in the fuel cell system. In addition, water is generated at the cathode, and this cathode-generated water can be recirculated to the anode for use in the anodic portion of the process (1). Water is also important for maintaining adequate hydration of the membrane. However, too much water can lead to cathode flooding. Thus, it is desirable to finely control the water balance throughout the fuel cell system.

The present invention is described in conjunction with a stack comprised of more than one fuel cell, and which typically include more than one bipolar plate. However, those skilled in the art will recognize that the precise configuration of the fuel cells may comprise a single fuel cell, or a plurality of fuel cells arranged in a substantially planar system, while remaining within the scope of the present invention.

Some systems that have water management techniques have been known such as active systems which are based on feeding the cell anode with a very diluted (2%) methanol solution, pumping excess amounts of water at the cell cathode back to cell anode and dosing the recirculation liquid with neat methanol stored in a reservoir. Such active systems that include pumping can provide, in principle, maintenance of appropriate water level in the anode by dosing the methanol from a fuel delivery cartridge into a recirculation loop. The loop also receives water that is collected at the cathode and pumped back into the recirculation anode liquid. In this way, a desired water/methanol anode mix can be maintained. However, the multiple pumps that are needed to carry the various solutions throughout the fuel cell can lead to parasitic losses that ultimately result in a less efficiently operating fuel cell system. This has been particularly true in high power applications in which a fuel cell stack is employed.

Another challenge arises in a system containing a fuel cell stack when it is necessary to purge the stack of fluids. This procedure might be performed to change the fuel concentration if a lower or higher than desired concentration has developed within the stack. Other situations in which a stack purge is performed is when the system is to be shutdown for a routine maintenance check or for repairs, where the pressure within the fuel cell is greater than desired, or where it is desirable to put the fuel cell stack in a freeze tolerant state.

Temperature regulation is also a consideration in fuel cell system management. For example, fuel cell operating temperatures must be regulated so that the build up of excess heat is controlled. Sometimes excess heat must be dissipated. Ambient environmental conditions are also a factor in the dissipation of heat, and affect fuel cell performance, particularly in sub-freezing ambient environments.

Based upon all of these considerations, there remains a need for controlling the flow of fluids and controlling temperature in a fuel cell system, and specifically, there is a need for a fuel cell system in which the flow of fuel, water, effluents and other gases can be finely controlled depending upon the desired operating characteristics of the fuel cell system or the ambient environmental conditions. There remains a further need for a system that incorporates this functionality, but that does not require multiple pumps, even when the fuel cell system operates using a fuel cell stack for high power applications.

SUMMARY OF THE INVENTION

The disadvantages of prior techniques are overcome by the present invention, which is a fuel cell system that includes a fuel cell stack, a single pump and a sub-system of valves having selective positions and settings that can be adjusted by an associated microcontroller to control the flow of fluids within the system to thus manage the operation of the fuel cell stack. Several embodiments of the invention are described that include a single pump and multiple three-way valves. For example, fuel delivery from high and low concentration reservoirs is controlled by adjusting the states of the valves to deliver the desired fuel concentration via the pump and valve sub-system to the fuel cell stack, as needed. In other instances, unreacted fuel from the fuel cell stack can be delivered through an anode recirculation loop by adjusting the valves to settings that allow flow through the recirculation loop, for example. Those skilled in the art will recognize that any number of commonly known valves may be used to provide flow control to the invention set forth herein, including three-way valves, two-way valves, solenoid valves, bistable valves, proportional valves or other valves known to those skilled in the art.

In other embodiments of the invention, condensate collection is performed by providing a condensate collection point in fluid communication with a cathode output portion of the fuel cell stack. Condensate is the fluid that accumulates at the cathode plus any liquid generated by the cooling of gaseous exhaust from the fuel cell system, and is typically comprised of water, with a small amount of methanol and other substances also being present in said condensate. Condensate is collected from the cathode aspect of the fuel cell, either within the stack, or by using a separate manifold or other condenser known to those skilled in the art, and delivered to the recirculation loop or low concentration reservoir. The condensate collection can be performed even when the orientation of the fuel cell system is changed. In yet another embodiment, the system includes two condensate collection points in order to improve condensate collection in a variety of orientations and increase the condensate collection capacity. In cases in which the water loss from the fuel cell stack is sufficiently minimized so that the amount of methanol carried is sufficient for an attractive system energy density, condensate collection is not needed in such a system and, in that case, the valves can be set such that condensate collection is not performed, or the water collection subsystem can be omitted entirely from the system.

Several embodiments of the pump and valve sub-system of the present invention also allow for a stack purge state that can be activated upon system shut-down or as a recovery procedure should the fuel concentration in the stack become above or below acceptable limits or where the pressure within the fuel cell is greater than desired, or where it is desirable to put the fuel cell stack in a freeze tolerant state. The stack purge functionality of the system of the present invention benefits overall efficiency, stack control and provides the ability to put the system in a freeze-tolerant state.

A liquid/gas separator can be employed to remove undesired gas bubbles from the fluid conduits in some embodiments of the invention. An optional concentration sensor may be used to determine fuel concentration in the anode recirculation loop. In some embodiments, the system can also be operated without a concentration sensor. A pressure sensor can be included to determine if the recirculation loop is full, partially full or empty. A fuel filter may optionally be used to protect the pump and valves from any debris that may be present in the fuel mixture, the water or other effluents traveling throughout the conduits of the system. The single pump and valve sub-system yields a smaller total system size and lower electrical parasitic loss than for example, a in multi-pump design.

BRIEF DESCRIPTION OF THE DRAWINGS

The invention description below refers to the accompanying drawings, of which.

DETAILED DESCRIPTION OF AN ILLUSTRATIVE EMBODIMENT

Fuel Delivery

Figure 1A:
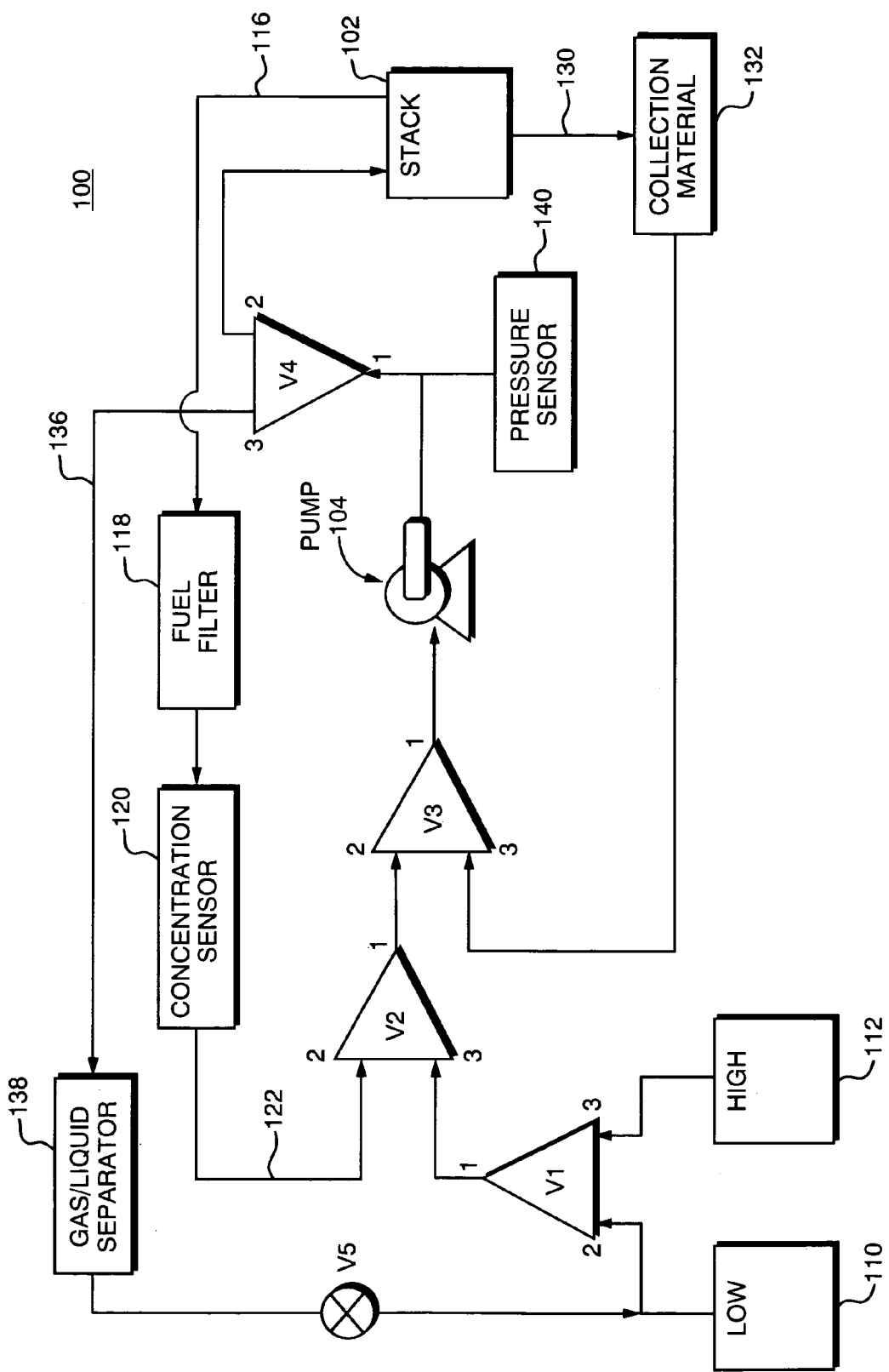
FIG. 1A is a schematic illustration of the single pump fuel cell system of the present invention that contains high and low dosing reservoirs as well as the water recirculation loop.

A first embodiment of the invention is illustrated in FIG. 1A, which depicts a fuel cell system 100 that includes a fuel cell stack 102. The fuel cell stack preferably includes a bipolar fuel cell plate with integrated gas separation, including but not limited to that set forth in commonly owned U.S. patent application Ser. No. 10/384,095, by DeFilippis, for a Bipolar Plate or Assembly having Integrated Gas-Permeable Membrane, which is incorporated herein by reference. Fuel is delivered to the fuel cell stack 102, in accordance with the present invention by the single pump 104 that is coupled to the valve sub-system, which, in the embodiment of FIG. 1A, includes five valves V1–V5. The valves are controlled by a processor (not shown) that will retrieve information regarding system operation and will issue commands signaling the settings for valves V1–V5, depending upon the current mode of operation of the system. Those skilled in the art will recognize that the system set forth herein can be used with a planar fuel cell array, or a single fuel cell as known to those skilled in the art. The invention set forth herein can also be implemented with any fuel cell system with a single pump and multiple valves for managing fluids within a fuel cell including direct oxidation fuel cell systems and reformer-based systems The invention can be implemented in fuel cell systems that use a proton exchange medium other than as described herein including but not limited to those systems that implement a silicon or liquid electrolyte. The fuel supply for the system is contained in a low concentration reservoir 110 and a high concentration reservoir 112. A first valve, V1, switches between the low concentration fuel in reservoir 110 and high concentration fuel in the reservoir 112. The fuel in the high concentration reservoir 112 is of a concentration of greater than 5% methanol to 100% (neat) methanol, and the low concentration fuel in the reservoir 110 typically ranges from about 0% to 50% methanol, but the concentration in the low concentration reservoir may actually be any amount that is of a comparatively lower concentration than that contained in the high concentration reservoir. The actual concentrations in the two reservoirs will depend upon a number of factors such as, for example, the components materials and architecture of the fuel cell system being used in a particular application of the invention. As will be understood by those skilled in the art, at 0% the low concentration reservoir would contain pure water. Those skilled in the art will also recognize that there may be other instances in which only one fuel concentration is needed or desired in a particular application of the invention in which case just one reservoir would be included in the system.

Valve V1 is a valve or valve assembly, including but not limited to a three-way valve, that can be positioned to allow low concentration fuel to flow from intake 2 to outlet 1. It is within the scope of the invention that valve V1 is positioned in a manner that it normally allows fuel from the low concentration reservoir 110. Alternatively, the valve V1 can be set to select high concentration fuel from the reservoir 112 so that there is fluid flow between intake 3 to outlet 1, as illustrated in the diagram. Alternatively, to provide for a predetermined concentration that falls between the low and high values, the valve V1 can be pulsed between opening intake positions 2 and 3 in such a manner that a fuel mixture is delivered via valve V1.

It may be desirable to fill the low concentration reservoir 110 with fuel that is of a desired initial concentration. In this case, the empty idle system is filled at startup with fuel directly from the low concentration reservoir 110. As will be understood by those skilled in the art during subsequent operation of the fuel cell system, there will be other concentration values that may be desirable in particular applications of the invention depending upon operational requirements, ambient temperature requirements and other conditions that will determine whether certain concentrations are desirable under particular circumstances. Then, those other concentrations can be achieved by adjusting the valves in the accordance with the invention.

Valve V2 switches between either dosing fuel from the reservoirs (via V1), or recirculating unreacted fuel from the anode recirculation loop. The terms "anode recirculation loop" and "recirculation loop", as used herein, shall mean those components that deliver and direct fuel to the stack and remove unreacted fuel from the stack. It may also be necessary to dose fresh fuel (from reservoirs 110 and/or 112) into the anode recirculation loop. In FIG. 1A, valves V2, V3 and V4, and elements 104, 102, 118, 120 and 122 and the conduits connecting these components comprise the anode recirculation loop 116.

More particularly, an anode recirculation loop 116 receives unreacted fuel from the anode portions of the cells in the fuel cell stack 102. The unreacted fuel exits the stack 102 via the conduit 116 and is then passed through an optional fuel filter 118. The filter 118 removes any particulates or debris may have been picked up in the stack or through the conduits of the system. The filtered fuel is then sent through a concentration sensor 120, if desired. This sensor 120 can be a separate fuel cell operable to act as a concentration sensor. A number of different elements can be employed for the concentration sensor, or alternatively, fuel cell characteristics can be measured and concentration can be determined from those measurements. The sensor can measure concentration, and this information can then be used to determine the whether the valves are to be set such that a low dose, or a high dose, or a recirculated fuel should be delivered to the fuel cell system. In other instances, the system can run without a concentration sensor, if desired, in a particular application of the invention. Those skilled in the art will recognize that the fuel filter 118 and concentration sensor 120 may be disposed anywhere in the recirculation loop depending on the desired form factor or operating characteristics of the fuel cell system.

After passing through the concentration sensor 120, if any, the fuel then continues to conduit portion 122 and thus to intake 2 of valve V2. As noted herein, valve V2 is set in position 2, to deliver unreacted fuel from the recirculation loop. Or, valve V2 delivers fuel from inlet 3 for fresh dosing from valve V1, as described herein.

Condensate Collection

The output of valve V2 is one of the inputs to valve V3. Valve V3 can be positioned to allow this fuel delivery from valve V2, or condensate collection. Condensate is liquid collected from the cathode aspect of the fuel cell, either within the stack, or by using a separate manifold or other condenser known to those skilled in the art, and is typically comprised of water and small amounts of methanol and other substances. More specifically, condensate collection is performed when condensate from the fuel cell 102 is fed via a conduit or wick 130 to a collection material 132. Collection material 132 is any material that can be used to transport condensate, and may consist of foams, felts, sponges, woven or nonwoven cloth or sintered metals, though other materials are also within the scope of the invention. The conduit or wick 130 and collection material 132 preferably permit condensate collection in any orientation of the fuel cell. The collected condensate is then sent to intake 3 of valve V3. If condensate collection is desired, valve V3 is set to receive condensate via intake 3, and allows condensate to flow through to the pump 104. The condensate is then delivered via the valve V4 through its intake 1 through its second outlet 3 through a conduit 136 to a gas/liquid separator 138. The condensate is then delivered into the low concentration reservoir 110. In this way, condensate from the stack is retrieved and collected in the low concentration reservoir 110 for later use.

The gas/liquid separator 138 may be desirable because the pump 104 may draw a substantial amount of gas when drawing condensate out of the collection material 132. This additional gas effluent is preferably eliminated or reduced prior to entry into the low concentration reservoir 110, or used to perform other work within the system. Otherwise, volume in the low concentration reservoir 110 that is intended for low concentration fuel is instead taken up by a gaseous effluent which is undesirable.

As will be understood by those skilled in the art, and depending on the operating conditions there may be instances in which the fuel cell stack requires the addition of water, instead of fuel. This can be accomplished with the valve V4 positioned in such a mode that the condensate, which is primarily comprised of water, from the collection material 132 is delivered to the stack 102. In such a case, valve V3 is set such that condensate at intake 3 is delivered into the system and valve V4 is set such that its outlet 2 is open routing the collected condensate through valve V4 to the stack 102.

To summarize, Table 1 indicates the valve states in various modes of operation of the fuel cell system 100.

TABLE 1

| State | V1 | V2 | V3 | V4 | V5 |
| --- | --- | --- | --- | --- | --- |
| Recirculation | N/D | 1-2 | 1-2 | 1-2 | Closed |
| Low Dose | 1-2 | 1-3 | 1-2 | 1-2 | Closed |
| High Dose | 1-3 | 1-3 | 1-2 | 1-2 | Closed |
| H2O collection | 1-3 | N/D | 1-3 | 1-3 | Open |
| Stack Purge | 1-3 | 1-2 | 1-2 | 1-3 | Open |

Referring to Table 1, when it is desired to operate in a recirculation mode, the valves are set as in the first row of the table. Valve V1's state is not determinative of recirculation within the fuel cell, since valve V2 will not accept fluid from V1 in this state, and valve V1 is thus designated as "N/D" within the Table 1. It should be understood that "N/D" throughout the tables herein shall mean that the state of the relevant valve is not determinative in that mode of operation. Valve V2 is in a 1-2 state meaning that the intake 2 is drawing recirculated fuel from the stack 102 and delivering it through outlet 1. Valve V3 is also in its 1-2 state, in which recirculated fuel is being drawn from valve V2 and delivered to the pump 104. Valve V4, in this instance, is also in a 1-2 state such that the recirculated fuel is flowing from the inlet 1 through outlet 2 and into the stack. Valve V5 is closed.

In a low dose mode, where it is desirable to add lower concentration fuel to the recirculation loop, valve V1 is in a 1-2 state so that it is drawing fuel from the low concentration fuel reservoir 110, valve V3 is in a 1-3 state so that fuel is drawn through valve V2 and is sent to valve V3, valve V3 is in a 1-2 state so that fuel from the low concentration fuel reservoir is sent to the pump 104. Valve V4 is again in the 1-2 state so that fuel is delivered to the stack 102.

In a high dose mode, where it is desirable to add higher concentration fuel to the recirculation loop, Valve V1 is in a 1-3 position so that the high concentration fuel from the reservoir 112 is drawn to valve V2, and the remaining positions are self-explanatory when referring to Table 1.

In a stack purge mode, where the objective is to clear the stack and the recirculation loop of at least a portion of the fluid contained therein, valve V1 is in a 1-3 setting, valve V2 is in a 1-2 setting so that the recirculation loop is opened and the stack volume of unreacted methanol is delivered via the conduit 116 via the valve V2. Then the unreacted fuel is sent via valve V3 and then is pumped back around into the low concentration reservoir with valve V5 being in an open state. As noted, the stack purge state is preferably activated upon system shutdown or as a recovery procedure, for example, due to a situation where the pressure within the recirculation loop is above desired tolerances. Purging the stack volume into the low concentration reservoir 110 will increase the overall efficiency of the system as the fuel will not be lost to crossover or evaporation. The stack purge can serve as a recovery procedure should the fuel concentration in the stack, or other operating parameters fall outside of an acceptable range.

Another advantage is that the stack purge functionality is of substantial benefit with respect to overall efficiency, stack control, and the ability to put the system in a freeze-tolerant state. In other words, if the application device and associated fuel cell system are to be used in a subfreezing ambient environment, it may be best to purge the stack when the application device is not being powered by the fuel cell system in order to preserve the fuel and put the system in a freeze-tolerant state.

It is noted that the function of valve 5 is to prevent ambient gases from entering the gas/liquid separator 138 (FIG. 1A) and going into the low concentration reservoir 110. For example, when a low dose is being performed, valve V1 accepts lower concentration fuel via intake 2 and fuel is drawn from the low concentration reservoir 110. If valve V5 is not closed, air could instead be pulled from the gas/liquid separator 138. Thus, valve 5 is closed when a low dose is performed. The only time that valve 5 is opened is when fluid is to be passed through it.

An optional pressure sensor 140 may be used to determine if the recirculation loop 116 is full, partially full or empty, and whether or not there is appropriate pressure within the system. The optional concentration sensor 120, as noted, is used to determine the fuel concentration in the recirculation loop if desired in a particular application of the invention. As noted, the system can be operated without the concentration sensor cell 120.

Figure 1B:
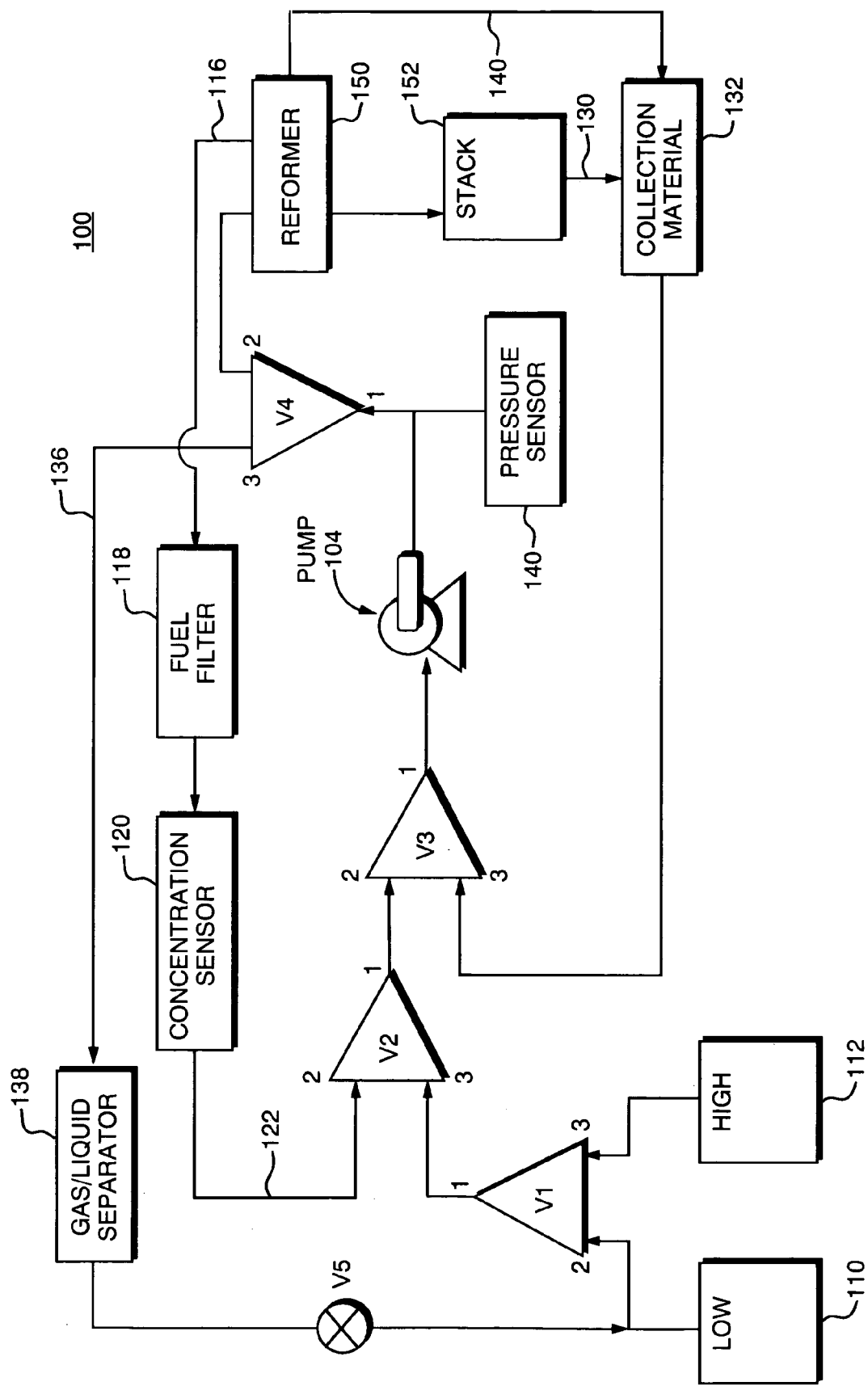
FIG. 1B is a schematic illustration of one embodiment of the single pump fuel cell system of the present invention that includes a reformer.

FIG. 1B illustrates another embodiment of the invention in which the single pump fuel cell system includes a reformer 150, which reforms the unreformed fuel from V4 and feeds reformed fuel consisting primarily of hydrogen into a suitable fuel cell stack 152. A condensate which is comprised of the products of the reaction used to reform the unreformed fuel from V4, and which typically include water, carbon monoxide, carbon dioxide and trace gases is sent via the conduit 140 to the collection material 132. Water from stack 152 is delivered to the collection material 132 via conduit 130. Gas separation, if needed, can be performed using methods known to those skilled in the art. Any methanol that is not reformed or turned into condensate is delivered into the recirculation loop 116. In this case, the recirculation loop 116 includes the reformer 150, but does not include the stack 152.

Figure 2:
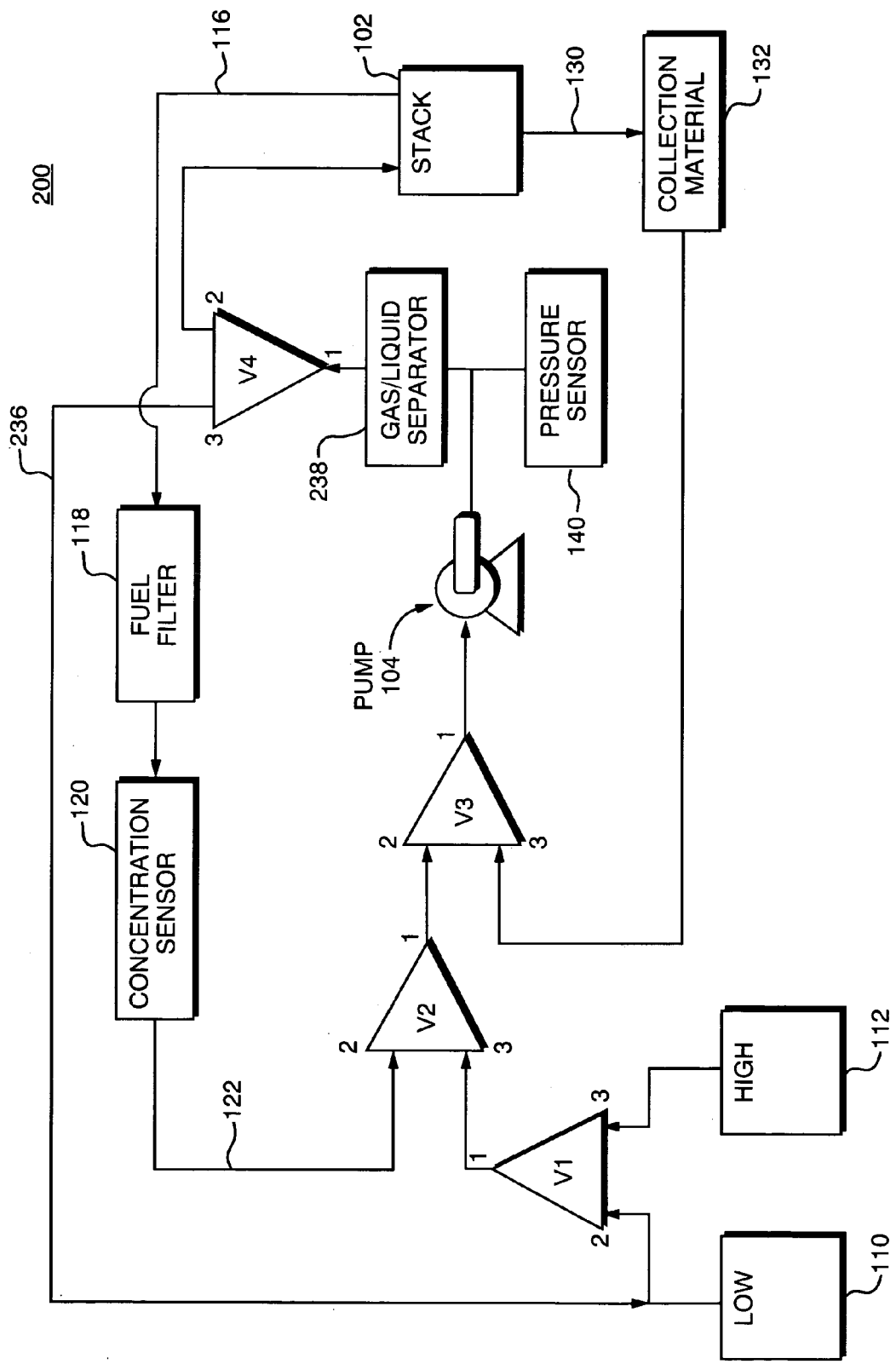
FIG. 2 is a schematic illustration of the single pump system of the present invention in which the gas separator is placed between the pump and the valve leading into the stack in accordance with another embodiment of the present invention.

FIG. 2 illustrates another embodiment of the invention in which like components have the same reference characters as in FIG. 1. In FIG. 2, however, the gas separator 238 is located between the pump 104 and valve V4. The gas/liquid separator 238 (which is identical to gas/liquid separator 138 in FIG. 1A) eliminates or reduces any gas bubbles that may have been picked up when condensate is drawn by valve V3 from the collection material 132. This gas is separated out so that when valve V4 switches between sending fluid to the stack 102 or to the low concentration reservoir 110, any gaseous effluent has been removed. The embodiment of FIG. 2 is a more simplified system, as compared to the embodiment set forth in FIG. 1, because valve V5 is eliminated. However, in order to eliminate valve 5, it is assumed that the dosage is being mixed well by discrete additions of fuel and that there is not a large ripple of high concentration fuel that is going to pass through separator 238. The risk is that the high concentration fuel tends to "wet out" gas/liquid separators, rendering them less effective than desired. Thus, the embodiment of FIG. 2 is preferably employed when mixing is performed adequately, or where the gas/liquid separator does not otherwise "wet out" with prolonged exposure to the fuel that is being deployed.

Table 2 below indicates the valve settings for each particular mode for the embodiment of FIG. 2. Table 2 has the same values as Table 1, except that valve 5 has been eliminated.

TABLE 2

|  | State | | | |
| --- | --- | --- | --- | --- |
|  | V1 | V2 | V3 | V4 |
| Recirculation | N/D | 1-2 | 1-2 | 1-2 |
| Low Dose | 1-2 | 1-3 | 1-2 | 1-2 |
| High Dose | 1-3 | 1-3 | 1-2 | 1-2 |
| H2O collection | 1-3 | N/D | 1-3 | 1-3 |
| Stack Purge | 1-3 | 1-2 | 1-2 | 1-3 |

In an alternative embodiment (not shown), it may be desirable to be able to purge the anode recirculation loop in a system where condensate is not collected. In that embodiment, conduit 130, collection material 132, and valve V3, as well as all conduits connecting them, may be eliminated.

Figure 3:
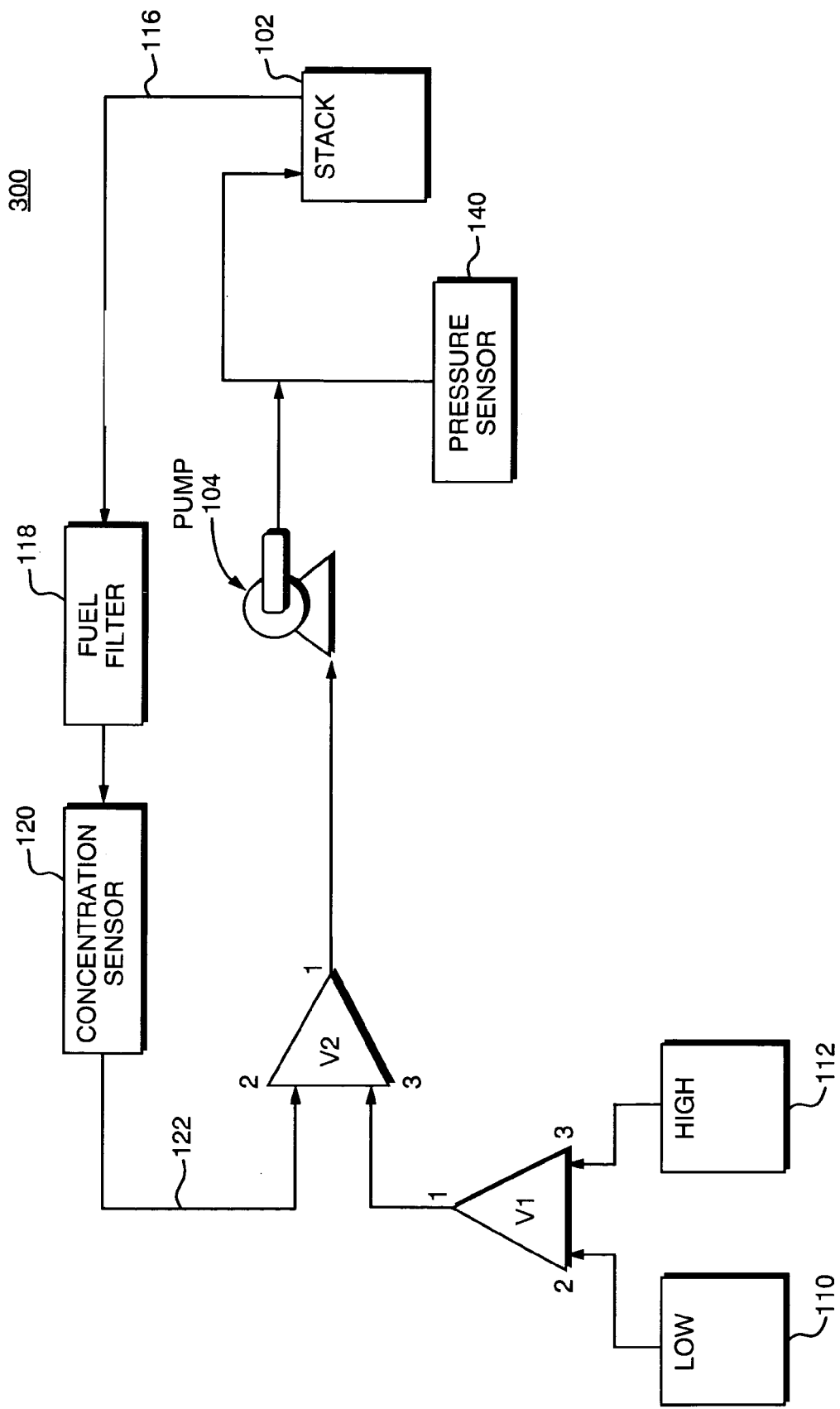
FIG. 3 is a schematic illustration of another embodiment of the system of the present invention in which there is no water collection mechanism.

Another embodiment of the invention is illustrated in FIG. 3, which shows fuel cell system 300. The components illustrated in FIG. 3, which correspond with those of FIGS. 1 and 2, have the same reference characters as in the other figures. The fuel cell system 300 of FIG. 3 is a simplified system for use when there is no need for water collection. In that instance, the collection material 132 and valve V3 are not necessary, and can be eliminated to simplify the system. In addition, in this system valve V4 is not necessary because there is no need to recirculate condensate back into the low concentration reservoir 110. For example, if recirculation is desired, the status of valve V1 is not relevant as valve V2 will be in a state in which intake 2 is opened to deliver the effluent recirculated from the stack 102, rather than accepting fuel from V1. A low dose setting involves valve V1 at a 1-2 state such that the intake 2 draws low concentration fuel from the reservoir 110 and sends it to valve V2. For a high dose valve V1 is in state 1-3 so that its inlet 3 draws high concentration fuel from the reservoir 112 and sends it through valve V1, through valve V2, via the pump 104, into the stack 102. The settings are summarized in Table 3.

TABLE 3

|  | State | |
| --- | --- | --- |
|  | V1 | V2 |
| Recirculation | N/D | 1-2 |
| Low Dose | 1-2 | 1-3 |
| High Dose | 1-3 | 1-3 |

Accordingly, the system 300 of FIG. 3 can be employed when the water loss rate from the stack is improved such that additional water is not needed to replace water loss from the stack.

Figure 4:
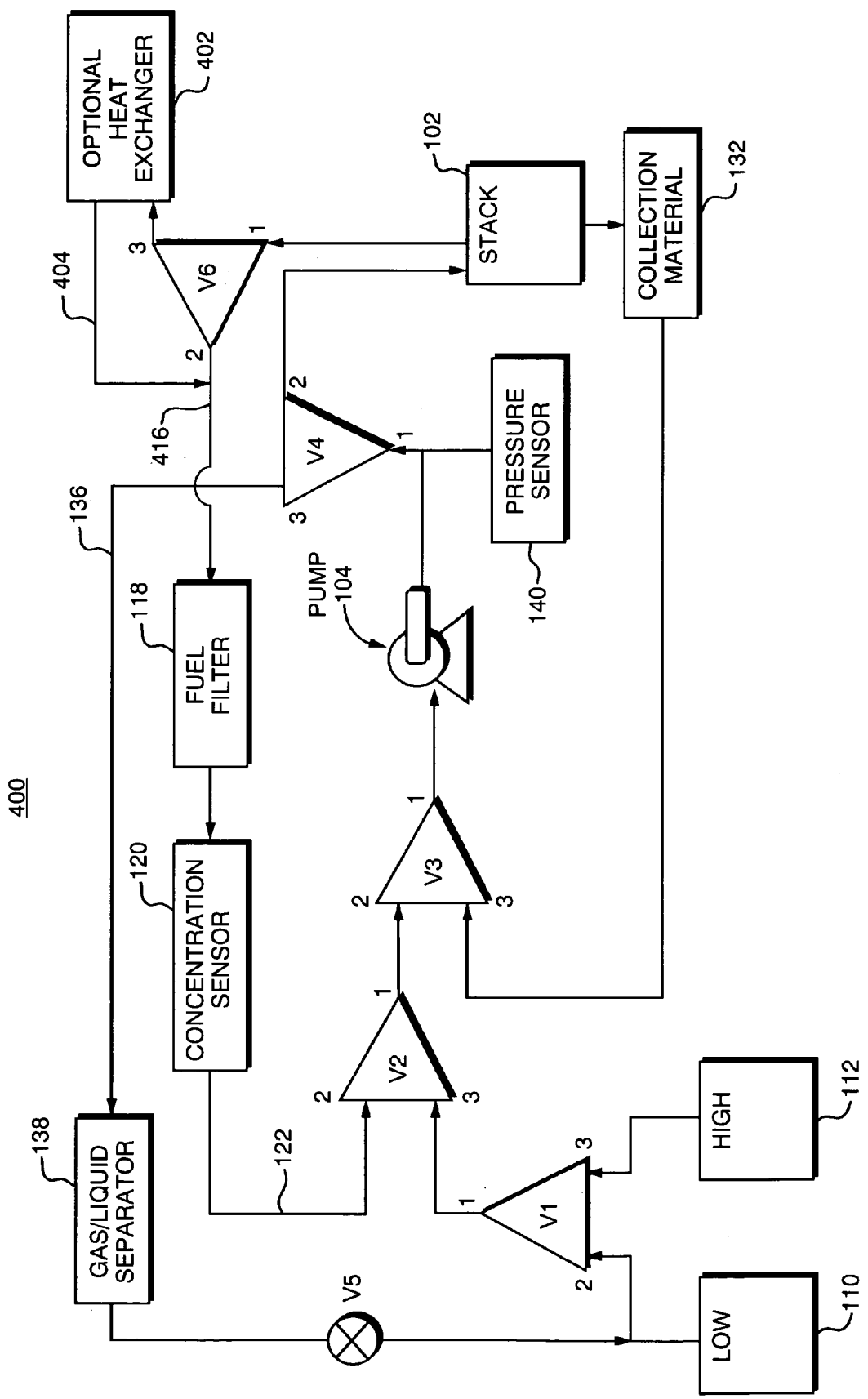
FIG. 4 is a further embodiment of a system in accordance with the present invention that allows for excess waste heat to be dissipated.

Referring now to FIG. 4, the system 400 of FIG. 4 is a single pump six-valve fluidic system that includes an optional heat exchanger. As noted, with respect to the other figures, components that are the same or similar to those set forth in the earlier figures have the same reference characters and components that have been added or relocated are assigned new reference characters.

FIG. 4 is similar to system 100 in FIG. 1A, but contains a heat exchanger 402 and associated fluid conduits and controls. It is often necessary or desirable to have controlled thermal management of the system. Heat is generated by the fuel cells in the stack, the electronics utilized to control the system, and possibly by the application to which power is being provided (not shown). A heat exchanger 402 can be employed that receives a fluid via valve V6. When Valve V6 is in the 1-3 state, the heat exchanger is part of the recirculation loop, and when Valve V6 is in the 1-2 state, the recirculation loop does not include heat exchanger 402. Valve V6 has an intake 1 and outlet 2-3. In the 1-3 state, valve V6 delivers unreacted fuel from the stack through heat exchanger 402, which cools the fluid and returns it back to the conduit 404. It then continues within the recirculation loop including 416, passes through the fuel filter 118 and the concentration sensor 120 in the manners described hereinbefore. Alternatively, when heat dissipation is not needed, V6 is actuated in such a manner that unreacted fuel enters the intake 1, bypasses the heat exchanger 402, and continues within the recirculation loop including 416 directly through outlet 2. The heat exchanger 402 can be one of common design, and which uses methods well known to those skilled in the art, including a series of tubes which is exposed to the ambient environment. It is further possible to have active airflow to assist in the removal of heat from the heat exchanger via a fan or other air moving device, which may be a discrete component or integrated into heat exchanger 402. The heat exchanger 402 and/or Valve V6 can be thermally actuated, and valve V6 can be any valve known to those skilled in the art. For a further simplified system, the valve V6 can be eliminated, and the recirculation fluid is always sent through the heat exchanger 402, but optional fan could be turned on and off in response to operating conditions to either employ active heat exchange techniques or to simply deliver the fuel from the stack 102 to the recirculation loop 416. With respect to FIG. 4, V6 and heat exchanger 402 are shown as being in close communication with stack 102, however, they can be disposed anywhere in the recirculation loop 416.

Table 4 illustrates the valve states for the various modes of operation for the system 400 of FIG. 4. For example, recirculation without cooling would involve valve V1 in a its 1-2 state. Valve V2 would be in a 1-2 state so that it is drawing recirculated fuel via the recirculation loop 416. Valve V3 is then in a 1-2 state sending this recirculated fuel to the pump 104. Valve V4 is in its 1-2 state in which the recirculated fuel is sent to the stack 102. Valve V5 is closed because water collection is not being performed. Valve V6 is in a 1-2 state so that the recirculated fuel from the stack 102 is not being sent through the optional heat exchanger 1-2.

In comparison, the "recirculation with cooling" mode involves valve V6 is in a 1-3 state so that the intake 1 allows recirculated fuel from the stack to pass through the outlet 3 into the optional heat exchanger 402, which cools it before it continues through the recirculation loop 416. The other states of the Table 4 are similar to those described with respect to the earlier figures. It is noted that in the stack purge, valve V6 is in the 1-3 state in which cooling is performed as the stack is being purged.

TABLE 4

| State | V1 | V2 | V3 | V4 | V5 | V6 |
|---|---|---|---|---|---|---|
| Recirculation Without cooling | N/D | 1-2 | 1-2 | 1-2 | Closed | 1-2 |
| Recirculation with cooling | N/D | 1-2 | 1-2 | 1-2 | Closed | 1-3 |
| Low Dose | 1-2 | 1-3 | 1-2 | 1-2 | Closed | N/D |
| High Dose | 1-3 | 1-3 | 1-2 | 1-2 | Closed | N/D |
| H2O collection | 1-3 | N/D | 1-3 | 1-3 | Open | N/D |
| Stack Purge | 1-3 | 1-2 | 1-2 | 1-3 | Open | 1-3 |

Figure 5:
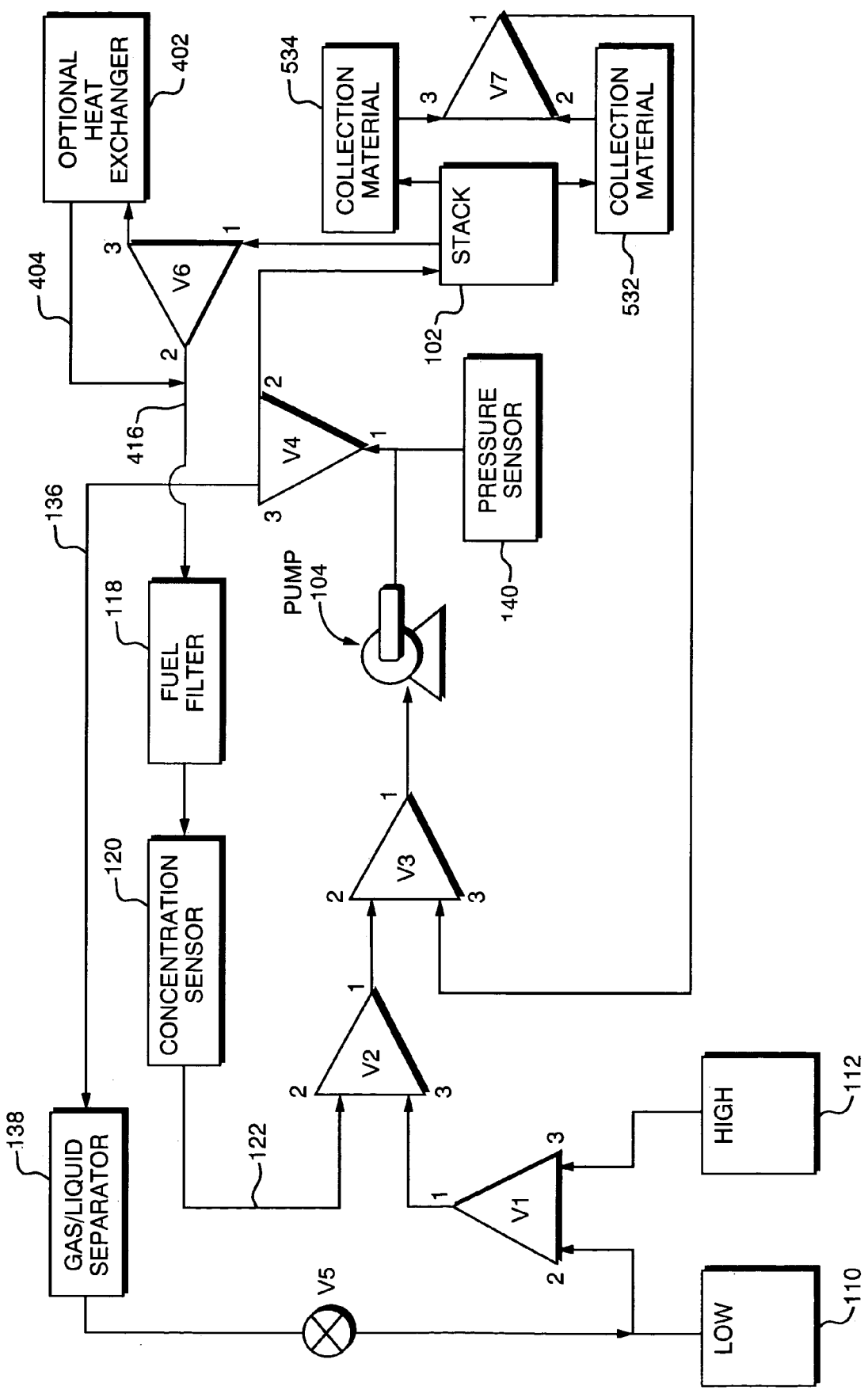
FIG. 5 is another embodiment of the invention, which has two water collection points in order to increase condensate collection capacity.

The embodiment illustrated in FIG. 5 is a system 500 that includes 7 valves and the optional heat exchanger 402, but also includes multiple collection points for condensate. This allows for additional condensate collection capacity and improves orientation independence of the device.

More specifically, system 500 of FIG. 5 includes a first collection material 532 and a second area of a collection material 534. Valve V7 switches between the condensate collection points 532 and 534 as necessary or desired in the system 500 and delivers the collected condensate to valve V3, in a water collection mode. Alternatively, there may be two condensate collection points in communication with V7, which is in further communication with a single collection material (not shown). This is summarized in the Table 5 below, which indicates states that are similar to those described herein with reference to the other figures. However, in the condensate collection mode, valve V7 is toggled between a 1-2 state or a 1-3 state and thus condensate as collected from the desired point, is delivered to the valve V3 that delivers it to the pump 104. Valve V4 then sends the condensate to valve V5 for delivery to the low concentration fuel reservoir 110. Not only does this system of FIG. 5 improve condensate collection in different orientations, but additional collection points may also be desirable in order to increase the condensate collection capacity should one collection point prove to be insufficient to support the system needs. This embodiment may be employed without the heat exchanger 402 and valve V6, and associated conduits.

TABLE 5

| State | V1 | V2 | V3 | V4 | V5 | V6 | V7 |
|---|---|---|---|---|---|---|---|
| Recirculation Without cooling | N/D | 1-2 | 1-2 | 1-2 | Closed | 1-2 | N/D |
| Recirculation with cooling | N/D | 1-2 | 1-2 | 1-2 | Closed | 1-3 | N/D |
| Low Dose | 1-2 | 1-3 | 1-2 | 1-2 | Closed | N/D | N/D |
| High Dose | 1-3 | 1-3 | 1-2 | 1-2 | Closed | N/D | N/D |
| H2O collection | 1-3 | N/D | 1-3 | 1-3 | Open | N/D | Toggle 1-2, 1-3 |
| Stack Purge | 1-3 | 1-2 | 1-2 | 1-3 | Open | 1-3 | N/D |

As described herein valves V1–V7 may be solenoid valves that have energized and de-energized states or three-way valves to minimize part count of the system. Other types of valves can be used similarly while remaining within the scope of the present invention. It should be understood that the embodiments illustrated herein allow for the use of a single pump in a fuel cell system that enables a smaller total system size and lower electrical parasitic loss than a multi-pump design.

The optional heat exchanger could be also employed to deliver heat to other portions of the fuel cell system if desired in a particular application of the invention. The systems shown in FIGS. 4 and 5 allow improved control of the stack temperature by allowing excess waste heat to be dissipated when required. The system of FIG. 5 allows for additional condensate collection capacity.

Although specific embodiments of the invention are illustrated in the Figures, the invention can be readily adapted in such a manner so as to include or omit features and components related to the following functionality: condensate collection, active thermal management and/or purging of the recirculation loop.

While the invention has been particularly shown and described with reference to preferred embodiments thereof, it will be understood by those skilled in the art that various changes in form and details can be made without departing from the spirit and scope of the invention. Furthermore, the terms and expressions that have been employed herein are used as terms of description and not of limitation. There is not intention in the use of such terms and expressions of excluding any equivalents of the features shown and described or portions thereof. It is recognized that various modifications are possible within the scope of the invention claimed.

What is claimed is:

1. A fluid control system for managing fluidic flow through a fuel cell system, comprising:
   (A) a fuel cell stack;
   (B) a fuel source comprised of a low concentration fuel reservoir and a high concentration fuel reservoir;
   (C) a valving system for controlling the flow of fluids throughout the fuel cell system including at least one of:
      (i) fuel dosing valve for selecting between low concentration fuel and/or high concentration fuel;
      (ii) a fuel delivery valve for controlling the fuel that is delivered to the fuel cell stack and through selected positioning, can select between recirculated fuel from the fuel cell stack and fuel from the dosing valve; and (iii) water collection system; and (D) a single pump coupled to said valving system, for delivering fluids to the fuel cell stack or to the low concentration fuel reservoir.

2. The fluid control system as defined in claim 1 further comprising a heat exchanger through which fluid can be passed in order to dissipate heat from the fuel cell system.

3. The fluid flow control system as defined in claim 1 wherein said water collection system includes a foam collection material.

4. The fluid control system as defined in claim 1 wherein said water collection system includes multiple water collection points and a valve assembly allowing for selection between said water collection points.

5. The fluid control system as defined in claim 1 wherein said valving system can be placed in a stack purge state for purging the stack volume of fluids into the low concentration reservoir.

6. The fluid control system as defined in claim 1 wherein at least a portion of the flow of the fluids transverse a recirculation loop, the fluid control system further comprising a pressure sensor coupled to determine if the recirculation loop is full, partially full or empty.

7. The fluid control system as defined in claim 1 further comprising a concentration sensor for determining the fuel concentration of the recirculated fuel.

8. The fluid control system as defined in claim 1 further comprising a fuel filter for removing debris from the conduits for protecting the single pump and valving system.

9. The fluid control system as defined in claim 1 further comprising a gas permeable, liquid impermeable separator coupled to the low concentration reservoir to collect any gas that is drawn by the pump when drawing condensate out of the water collection system.

10. The fluid flow control system as defined in claim 1 wherein said low concentration fuel reservoir is configured to collect water.

11. The fluid flow control system as defined in claim 1 wherein said valving system comprises valves selected from the group consisting of: three-way valves; two-way valves; solenoid valves; bistable valves; and proportional valves.

12. The fluid flow control system as defined in claim 1 further comprising a reformer.

13. The fluid flow control system as defined in claim 1 wherein said valving system can be adjusted for delivering a desired fuel concentration to the fuel cell stack from the low concentration fuel and/or high concentration fuel.

14. The fluid flow control system as defined in claim 7 wherein said valving system can be adjusted for delivering a desired fuel concentration to the fuel cell stack from the low concentration fuel and/or high concentration fuel and/or recirculated fuel in response to the determined fuel concentration of the recirculated fuel.

* * * * *